(12) United States Patent
Lubbers et al.

(10) Patent No.: US 7,478,215 B2
(45) Date of Patent: Jan. 13, 2009

(54) MULTI-CONTROLLER WRITE OPERATIONS

(75) Inventors: Clark E. Lubbers, Colorado Springs, CO (US); R. Brian Schow, Monument, CO (US); Wayne Umland, Colorado Springs, CO (US); Randy L. Roberson, New Port Richey, FL (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 11/108,360

(22) Filed: Apr. 18, 2005

(65) Prior Publication Data

US 2005/0203874 A1    Sep. 15, 2005

Related U.S. Application Data

(63) Continuation of application No. 10/053,991, filed on Oct. 22, 2001, now Pat. No. 6,931,487.

(51) Int. Cl.
G06F 12/00 (2006.01)
G06F 17/30 (2006.01)

(52) U.S. Cl. .......................................... 711/169; 707/1
(58) Field of Classification Search ................ 711/169; 707/1
See application file for complete search history.

(56) References Cited

U.S. PATENT DOCUMENTS

| | | | |
|---|---|---|---|
| 5,923,876 A | 7/1999 | Teague | |
| 6,044,225 A * | 3/2000 | Spencer et al. ................. | 710/52 |
| 6,161,192 A | 12/2000 | Lubbers | |
| 6,170,063 B1 | 1/2001 | Golding | |
| 6,252,886 B1 * | 6/2001 | Schwager et al. ............ | 370/443 |
| 6,292,877 B1 * | 9/2001 | Ryan .......................... | 711/169 |
| 6,295,578 B1 | 9/2001 | Dimitroff | |
| 6,397,293 B2 | 5/2002 | Shrader | |
| 6,425,034 B1 * | 7/2002 | Steinmetz et al. ........... | 710/305 |
| 6,487,636 B1 | 11/2002 | Dolphin | |
| 6,490,122 B1 | 12/2002 | Holmquist | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliot | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |

(Continued)

Primary Examiner—Hyung S Sough
Assistant Examiner—Mardochee Chery

(57) ABSTRACT

A system and method for high performance multi-controller processing is disclosed. Independent Network storage controllers (NSCs) are connected by a high-speed data link. The NSCs control a plurality of storage devices. connected by a Fiber Channel Arbitrated Loop (FCAL). To provide redundancy, for a given logical unit of storage one NSC will function as the primary controller and the other NSC will function as the primary controller and the enhance the efficiency of command-response data transfers between NSCs, mirror memory is correlated with primary memory and named resources are used for command-response data transfers. Methods are disclosed to provide for efficient active mirroring of data.

14 Claims, 4 Drawing Sheets

U.S. PATENT DOCUMENTS

| | | | |
|---|---|---|---|
| 6,663,003 B2 | 12/2003 | Johnson | |
| 6,681,308 B1 | 1/2004 | Dallmann | |
| 6,681,339 B2 * | 1/2004 | McKean et al. | 714/5 |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B2 | 6/2004 | Reuter | |
| 6,763,409 B1 | 7/2004 | Elliot | |
| 6,772,231 B2 | 8/2004 | Reuter | |
| 6,775,790 B2 | 8/2004 | Reuter | |
| 6,795,904 B1 | 9/2004 | Kamvysselis | |
| 6,802,023 B2 | 10/2004 | Oldfield | |
| 6,807,605 B2 | 10/2004 | Umberger | |
| 6,817,522 B2 | 11/2004 | Brignone | |
| 6,823,453 B1 | 11/2004 | Hagerman | |
| 6,839,824 B2 | 1/2005 | Camble | |
| 6,842,833 B1 | 1/2005 | Phillips | |
| 6,845,403 B2 | 1/2005 | Chadalapaka | |
| 6,876,668 B1 * | 4/2005 | Chawla et al. | 370/468 |
| 2002/0019863 A1 | 2/2002 | Reuter | |
| 2002/0019908 A1 | 2/2002 | Reuter | |
| 2002/0019920 A1 | 2/2002 | Reuter | |
| 2002/0019922 A1 | 2/2002 | Reuter | |
| 2002/0019923 A1 | 2/2002 | Reuter | |
| 2002/0048284 A1 | 4/2002 | Moulton | |
| 2002/0188800 A1 | 12/2002 | Tomaszewski | |
| 2003/0051109 A1 | 3/2003 | Cochran | |
| 2003/0056038 A1 | 3/2003 | Cochran | |
| 2003/0063134 A1 | 4/2003 | Lord | |
| 2003/0074492 A1 | 4/2003 | Cochran | |
| 2003/0079014 A1 | 4/2003 | Lubbers | |
| 2003/0079074 A1 | 4/2003 | Sicola | |
| 2003/0079082 A1 | 4/2003 | Sicola | |
| 2003/0079083 A1 | 4/2003 | Lubbers | |
| 2003/0079102 A1 | 4/2003 | Lubbers | |
| 2003/0079156 A1 | 4/2003 | Sicola | |
| 2003/0084241 A1 | 5/2003 | Lubbers | |
| 2003/0101318 A1 | 5/2003 | Kaga | |
| 2003/0110237 A1 | 6/2003 | Kitamura | |
| 2003/0126315 A1 | 7/2003 | Tan | |
| 2003/0126347 A1 | 7/2003 | Tan | |
| 2003/0140191 A1 | 7/2003 | McGowen | |
| 2003/0145045 A1 | 7/2003 | Pellegrino | |
| 2003/0145130 A1 | 7/2003 | Schultz | |
| 2003/0170012 A1 | 9/2003 | Cochran | |
| 2003/0177323 A1 | 9/2003 | Popp | |
| 2003/0187847 A1 | 10/2003 | Lubbers | |
| 2003/0187947 A1 | 10/2003 | Lubbers | |
| 2003/0188085 A1 | 10/2003 | Arakawa | |
| 2003/0188114 A1 | 10/2003 | Lubbers | |
| 2003/0188119 A1 | 10/2003 | Lubbers | |
| 2003/0188153 A1 | 10/2003 | Demoff | |
| 2003/0188218 A1 | 10/2003 | Lubbers | |
| 2003/0188229 A1 | 10/2003 | Lubbers | |
| 2003/0188233 A1 | 10/2003 | Lubbers | |
| 2003/0191909 A1 | 10/2003 | Asano | |
| 2003/0191919 A1 | 10/2003 | Sato | |
| 2003/0196023 A1 | 10/2003 | Dickson | |
| 2003/0212781 A1 | 11/2003 | Kaneda | |
| 2003/0229651 A1 | 12/2003 | Mizuno | |
| 2003/0236953 A1 | 12/2003 | Grieff | |
| 2004/0019740 A1 | 1/2004 | Nakayama | |
| 2004/0022546 A1 | 2/2004 | Cochran | |
| 2004/0024838 A1 | 2/2004 | Cochran | |
| 2004/0024961 A1 | 2/2004 | Cochran | |
| 2004/0030727 A1 | 2/2004 | Armangau | |
| 2004/0030846 A1 | 2/2004 | Armangau | |
| 2004/0049634 A1 | 3/2004 | Cochran | |
| 2004/0078638 A1 | 4/2004 | Cochran | |
| 2004/0078641 A1 | 4/2004 | Fleischmann | |
| 2004/0128404 A1 | 7/2004 | Cochran | |
| 2004/0168034 A1 | 8/2004 | Sigeo | |
| 2004/0215602 A1 | 10/2004 | Cioccarelli | |
| 2004/0230859 A1 | 11/2004 | Cochran | |
| 2004/0267959 A1 | 12/2004 | Cochran | |

* cited by examiner

MULTI-CONTROLLER WRITE OPERATIONS

RELATED APPLICATIONS

This application is a continuation of U.S. patent application Ser. No. 10/053,991, entitled HIGH PERFORMANCE MULTI-CONTROLLER PROCESSING, filed Oct. 22, 2001, now U.S. Pat. No. 6,931,487 the disclosure of which is hereby incorporated by reference in its entirety.

BACKGROUND

1. Field of the Invention

The present invention relates generally to computer-based information storage systems. More particularly, the present invention relates to systems and methods for coordinating operations and information transfer between dual controllers in a computer-based information storage system such as, for example, a RAID storage system.

2. Relevant Background

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technologies are used to provide storage with greater capacity, higher reliability, and higher availability. The present invention is directed primarily at network storage systems that are designed to provide shared data storage that is beyond the ability of a single host computer to efficiently manage.

To this end, mass data storage systems are implemented in networks or fabrics that provide means for communicating data with the storage systems. Host computers or servers are coupled to the network and configured with several disk drives that cumulatively provide more storage capacity or different storage functions (e.g., data protection) than could be implemented by a DAS system. In many cases, dedicated data storage systems implement much larger quantities of data storage than would be practical for a stand-alone computer or workstation. Moreover, a server dedicated to data storage can provide various degrees of redundancy and mirroring to improve access performance, availability and reliability of stored data.

However, because the physical storage disks are ultimately managed by particular servers to which they are directly attached, many of the limitations of DAS are ultimately present in conventional SAN systems. Specifically, a server has limits on how many drives it can manage as well as limits on the rate at which data can be read from and written to the physical disks that it manages. Accordingly, server-managed SAN provides distinct advantages over DAS, but continues to limit the flexibility and impose high management costs on mass storage implementation.

A significant difficulty in providing storage is not in providing the quantity of storage, but in providing that storage capacity in a manner than enables ready, reliable access with simple interfaces. Large capacity, high availability, and high reliability storage architectures typically involve complex topologies of physical storage devices and controllers. By "large capacity" it is meant storage systems having greater capacity than a single mass storage device. High reliability and high availability storage systems refer to systems that spread data across multiple physical storage systems to ameliorate risk of data loss in the event of one or more physical storage failures. Both large capacity and high availability/ high reliability systems are implemented, for example, by RAID (redundant array of independent drive) systems.

Storage management tasks, which often fail on an information technology (IT) staff, often extend across multiple systems, multiple rooms within a site, and multiple sites. This physical distribution and interconnection of servers and storage subsystems is complex and expensive to deploy, maintain and manage. Essential tasks such as backing up and restoring data are often difficult and leave the computer system vulnerable to lengthy outages.

Storage consolidation is a concept or growing interest. Storage consolidation refers to various technologies and techniques for implementing mass storage as a unified, largely self-managing utility for an enterprise. By unified it is meant that the storage can be accessed using a common interface without regard to the physical implementation or redundancy configuration. By self-managing it is meant that many basic tasks such as adapting to changes in storage capacity (e.g., adding or removing drives), creating redundancy sets, and the like are performed automatically without need to reconfigure the servers and client machines accessing the consolidated storage.

Computers access mass storage capacity through a file system implemented with the storage system's operating system. A file system is the general name given to the logical structures and software routines, usually closely tied to the operating system software, that are used to control access to storage. File systems implement a mapping data structure that associates addresses used by application software to addresses used by the underlying storage layers. While early file systems addressed the storage using physical information about the hard disk(s), modern file systems address logical units (LUNs) that comprise a single drive, a portion of a drive, or more than one drive.

Modern file systems issue commands to a disk controlled either directly, in the case of direct attached storage, or through a network connection, in the case of network file systems. A disk controller is itself a collection of hardware and software routines that translate the file system commands expressed in logical terms into hardware-specific commands expressed in a protocol understood by the physical drives. The controller may address the disks physically, however, more commonly a controller addresses logical block addresses (LBAs). The disk drives themselves include a controller that maps the LBA requests into hardware-specific commands that identify a particular physical location on a storage media that is to be accessed.

Despite the fact that disks are addressed logically rather than physically, logical addressing does not truly "virtualize" the storage. Presently, a user (i.e., IT manager) is required to have at least some level of knowledge about the physical storage topology in order to implement, manage and use large capacity mass storage and/or to implement high reliability/ high availability storage techniques. User awareness refers to the necessity for a user of the mass storage to obtain knowledge of physical storage resources and topology in order to configure controllers to achieve a desire storage performance. In contrast, personal computer technology typically does not require user awareness to connect to storage on a local area network (LAN) as simple configuration utilities allow a user to point to the LAN storage device an connect to it. In such cases, a user can be unaware of the precise physical implementation or the LAN storage, which may be implemented in multiple physical devices and may provide RAID-type data protection.

Hence, even though the storage may appear to an end-user as abstracted from the physical storage devices, in fact the storage is dependent on the physical topology of the storage devices. A need exists for systems, methods and software that effect a true separation between physical storage and the logical view of storage presented to a user. Similarly, a need exists for systems, methods and software that merge storage management functions within the storage itself.

Storage virtualization generally refers to systems that provide transparent abstraction of storage at the block level. In essence, virtualization separates out logical data access from physical data access, allowing users to create virtual disks from pools of storage that are allocated to network-coupled hosts as logical storage when needed. Virtual storage eliminates the physical one-to-one relationship between servers and storage devices. The physical disk devices and distribution of storage capacity become transparent to servers and applications.

Virtualization can be implemented at various levels within a SAN environment. These levels can be used together or independently to maximize the benefits to users. At the server level, virtualization can be implemented through software residing on the server that causes the server to behave as if it is in communication with a device type even though it is actually communicating with a virtual disk. Server-based virtualization has limited interoperability with hardware or software components. As an example of server-based storage virtualization, Compaq offers the Compaq SANworks™ Virtual Replicator.

Compaq VersaStor™ technology is a example of fabric-level virtualization. In Fabric-level virtualization, a virtualizing controllers is coupled to the SAN fabric such that storage requests made by any host are handled by the controller. The controller maps requests to physical devices coupled to the fabric. Virtualization at the fabric level has advantages of greater interoperability, but is, by itself, an incomplete solution for virtualized storage. The virtualizing controller must continue to deal with the physical storage resources at a drive level. What is needed is a virtualization system that operates at a system level (i.e., within the SAN).

Storage system architecture involves two fundamental tasks: data access and storage allocation. Data is accessed by mapping an address used by the software requesting access to a particular physical location. Hence, data access requires that a data structure or memory representation of the storage system that this mapping be available for search, which typically requires that the data structure be loaded into memory of a processor managing the request. For large volumes of storage, this mapping structure can become very large. When the mapping data structure is too large for the processor's memory, it must be paged in and out of memory as needed, which results in a severe performance penalty. A need exists for a storage system architecture that enables a memory representation for large volumes of storage using limited memory so that the entire data structure can be held in memory.

Storage allocation refers to the systems and data structures that associate particular storage resources of a physical storage device (e.g., disks or portions of disks) with a particular purpose or task. Storage is typically allocated in larger quantities, called "chunks" or "clusters", than the smallest quantity of data that can be accessed by a program. Allocation is closely tied to data access because the manner in which storage is allocated determines the size of the data structure required to access the data. Hence, a need exists for a storage allocation system that allocates storage in a manner that provides efficient data structures for accessing the data.

Disk controllers may fail periodically. To reduce the likelihood that a disk controller failure will cause a storage system to fail, many storage systems implement redundant disk controllers. To provide effective redundancy, each disk controller in a set of redundant disk controllers must have the capability to assume the functions of the other disk controller's; in the event of a failure. Therefore, there is a need in the mass storage system arts to provide effective redundant disk controller capability.

SUMMARY

In one aspect, the present invention provides a storage system architecture and communication protocols that enable efficient communication between redundant disk controllers over a suitable communication link, e.g., a Fibre Channel (FC) link. The invention permits independent redundant disk controllers (i.e., controllers which do not share memory) to operate as coordinated controllers. Redundant disk controllers partition non-volatile memory into a primary segment and a mirror segment. A redundant disk controller allocates mirror memory that is linked to the primary memory in another disk controller, so that allocating a block of primary memory in a first disk controller automatically allocates a corresponding block of mirror memory in a second disk controller which functions as the mirror controller for the first disk controller.

In another aspect, the present invention provides for efficient transfer of command-response data between processors in redundant disk controllers. Command-response data is transmitted following a communication protocol that defines a named resource (e.g., a specific memory buffer) at the receiver. Because the resource is named, the sender knows that the resource is available when the sender receives an acknowledgement from the receiver. The sender can then utilize one available resource to transmit additional information.

In yet another aspect, the invention provides mechanisms to efficiently mirror data between coupled processors that do not share memory, e.g., between the processors of redundant controllers, over a communication link such as a FC link. A complex state machine is defined to provide atomic write of mirrored data with minimal exchange of control information between the processors. The invention enables a given processor to control allocation of resources on the "mirror segment" of its partner to provide algorithmic simplicity and high performance. Control sequences to prepare for reception (at the "mirror") of new write data may be issued in parallel with the request to fetch data from the host such that data can be transmitted directly to the mirror as soon as it has arrived.

In yet another aspect, the invention regulates the flow of data packets through a serial data path between redundant controllers so that command-response packets can be interspersed between data packets in a timely fashion. This aspect of the invention reduces likelihood that a glut of data packets traversing the data path will block command-response data packets causing the flow of data packets in the opposite direction.

DETAILED DESCRIPTION

System Architecture

The present invention generally involves a storage architecture that provides virtualized data storage at a system level, such that virtualization is implemented within a SAN. Virtualization in accordance with the present invention is implemented in a storage system controller to provide high performance, high data availability, fault tolerance, and efficient storage management. In the past, such behaviors would be implemented at the fabric or server level by, for example, hardware and software RAID controllers that would manage multiple directly attached disk drives.

In the examples used herein, the computing systems that require storage are referred to as hosts. In a typical implementation, a host is any computing system that consumes vast quantities of data storage capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides mass storage services for an enterprise. In the past, such a host would be outfitted with one or more disk controllers or RAID controllers that would be configured to manage multiple directly attached disk drives. The host connects to the virtualized SAN in accordance with the present invention with a high-speed connection technology such as a fibre channel (FC) fabric in the particular examples. Although the host and the connection between the host and the SAN are important components of the entire system, neither the host nor the FC fabric are considered components of the SAN itself.

The present invention implements a SAN architecture comprising a group of storage cells, where each storage cell comprises a pool of storage devices called a disk group. Each storage cell comprises parallel storage controllers coupled to the disk group. The storage controllers coupled to the storage devices using a fibre channel arbitrated loop (FCAL) connection, or through a network such as a fibre channel fabric or the like. The storage controllers are also coupled to each other through point-to-point connections to enable them to cooperatively manage the presentation of storage capacity to computers using the storage capacity.

The present invention is illustrated and described in terms of a distributed computing environment such as an enterprise computing system using a private SAN. However, an important feature of the present invention is that it is readily scaled upwardly and downwardly to meet the needs of a particular application.

Figure 1:
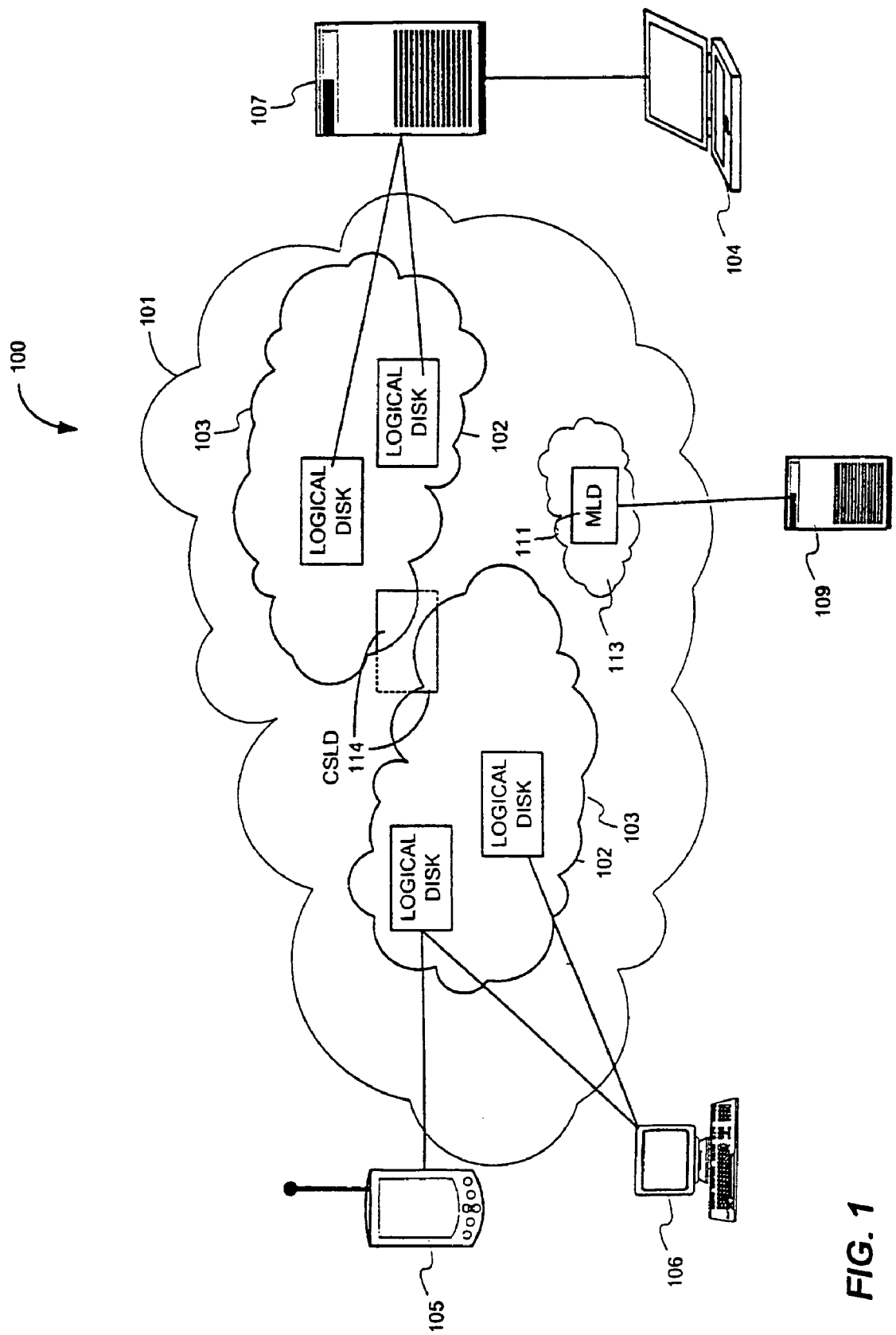
FIG. 1 shows a logical view of a networked computer environment in which the virtualized storage system in accordance with the present invention is implemented.

FIG. 1 shows a logical view of an exemplary SAN environment 100 in which the present invention may be implemented. Environment 110 shows a storage pool 101 comprising an arbitrarily large quantity of storage space from which logical disks (also called logical units or LUNs) 102 are allocated. In practice, storage pool 101 will have some finite boundaries determined by a particular hardware implementation, however, there are few theoretical limits to the size of a storage pool 101.

Within pool 101 logical device allocation domains (LDADs) 103 are defined. LDADs correspond to a set of physical storage devices from which LUNs 102 may be allocated. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essential a contiguous range of logical addresses that can be addressed by host devices 105, 106, 107 and 109 by mapping requests from the connection protocol used by the hosts to the uniquely identified LUN 102.

Some hosts such as host 107 will provide services of any type to other computing or data processing systems. Devices such as client 104 may access LUNs 102 via a host such as server 107 to which they are coupled through a LAN, WAN, or the like. Server 107 might provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. While the present invention is particularly directed to host systems that use large quantities of storage, it is uniquely able to provide such features as mirroring, parity protection, and striping in very small sized LUNs as well. In the past, such storage behaviors required multiple disks and so were inherently implemented with many gigabytes of storage. Hosts 105-107 may couple to multiple LUNs 102, and LUNs 102 may be shared amongst multiple hosts, although in a particular implementation each LUN 102 is presented to a specific host 105-107.

A LUN 102 comprises one or more redundant stores (RStore) which are the fundamental unit of reliable storage in the system of the present invention. An RStore comprises an ordered set of physical storage segments (PSEGs) with associated redundancy properties and is contained entirely within a single redundant store set (RSS). By analogy to conventional systems, PSEGs are analogous to disk drives and each RSS is analagous to a RAID storage set comprising a plurality of drives.

The PSEGs that implements a particular LUN 102 are spread across many, perhaps hundreds, of physical storage disks. Moreover, the physical storage capacity that a particular LUN 102 represents may be configured to implement a variety of storage types offering varying capacity, reliability and availability features. For example, some LUNs 102 may represent striped, mirrored and/or parity-protected storage. Other LUNs 102 may represent storage capacity that is configured without striping, redundancy or parity protection. As a practical consideration, the present invention limits LUNs 102 to 2 TByte capacity of any desired configuration, however, this limit can be readily extended independently of storage capacity of individual physical hard drives.

An RSS comprises a subset of physical disks in an LDAD. In preferred implementations, an RSS includes from six to eleven physical drives (which can change dynamically), and the physical drives may be of disparate capacities. Physical drives within an RSS are assigned indices (e.g., 0, 1, 2, . . . ,11) for mapping purposes. They may be further organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS in accordance with the present invention, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to a management logical disks (MLD) 111 which is a metadata container describing the logical structures used to create LUNs 102, LDADs 103, and other logical structures used by the system. A portion of the physical storage capacity available in storage pool 101 is reserved as quorum space 113 and cannot be allocated to LDADs 103, hence cannot be used to implement LUNs 102. In a particular example, each physical disk that participates in storage pool 101 has a reserved amount of capacity (e.g., the first "n" physical sectors) that are designated as quorum space 113. MLD 111 is mirrored in this quorum space of multiple physical drives and so can be accessed even if a drive fails. In a particular example, at least one physical drive is associated with each LDAD 103 includes a copy of MLD 111 (designated a "quorum drive"). SAN management appliance 109 may wish to associate information such as name strings for LDADs 103 and LUNs 102, and timestamps for object birthdates. To facilitate this behavior, the management agent uses MLD 111 to store this information as metadata. MLD 111 is created implicitly upon creation of each LDAD 103.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103, but that, unlike LUNs 102, span multiple LDADs 103. Preferably, each LDAD 103 includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each LUN 102 implemented within the LDAD 103. The CSLD 111 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" i.e., the drive is unavailable and requires regeneration of its data to a distributed spare).

A logical disk directory (LDDIR) data structure in CSLD 114 is a directory of all LUNs 102 in any LDAD 103. An entry in the LDDS comprises a universally unique ID (UUID) an RSD indicating the location of a Primary Logical Disk Metadata Container (PLDMC) for that LUN 102. The RSD is a pointer to the base RSDM or entry point for the corresponding LUN 102. In this manner, metadata specific to a particular LUN 102 can be accessed by indexing into the LDDIR to find the base RSDM of the particular LUN 102. The metadata with the PLDMC, e.g., mapping structures described hereinbelow) can be loaded into memory to realize the particular LUN 102.

Hence, the present invention implements multiple forms of metadata that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

To understand the scale of the present invention, it is contemplated that an individual LDAD 103 may correspond to from as few as four disk drives to as many as several thousand disk drives. In particular examples, a minimum of eight drives per LDAD is required to support RAID-1 within the LDAD 103 using four paired disks. LUNs 102 defined within an LDAD 103 may represent a few megabytes of storage or less, up to 2 TByte storage or more. Hence, hundreds or thousands of LUNs 102 may be defined within a given LDAD 103, and thus serve a large number of storage needs. In this manner a large enterprise can be served by a single storage pool 101 providing both individual storage dedicated to each workstation in the enterprise as well as shared storage across the enterprise. Further, an enterprise may implement multiple LDADs 103 and/or multiple storage pools 101 to provide a virtually limitless storage capability. Logically, therefore, the virtual storage system in accordance with the present invention offers great flexibility in configuration and access.

Figures 2, 3:
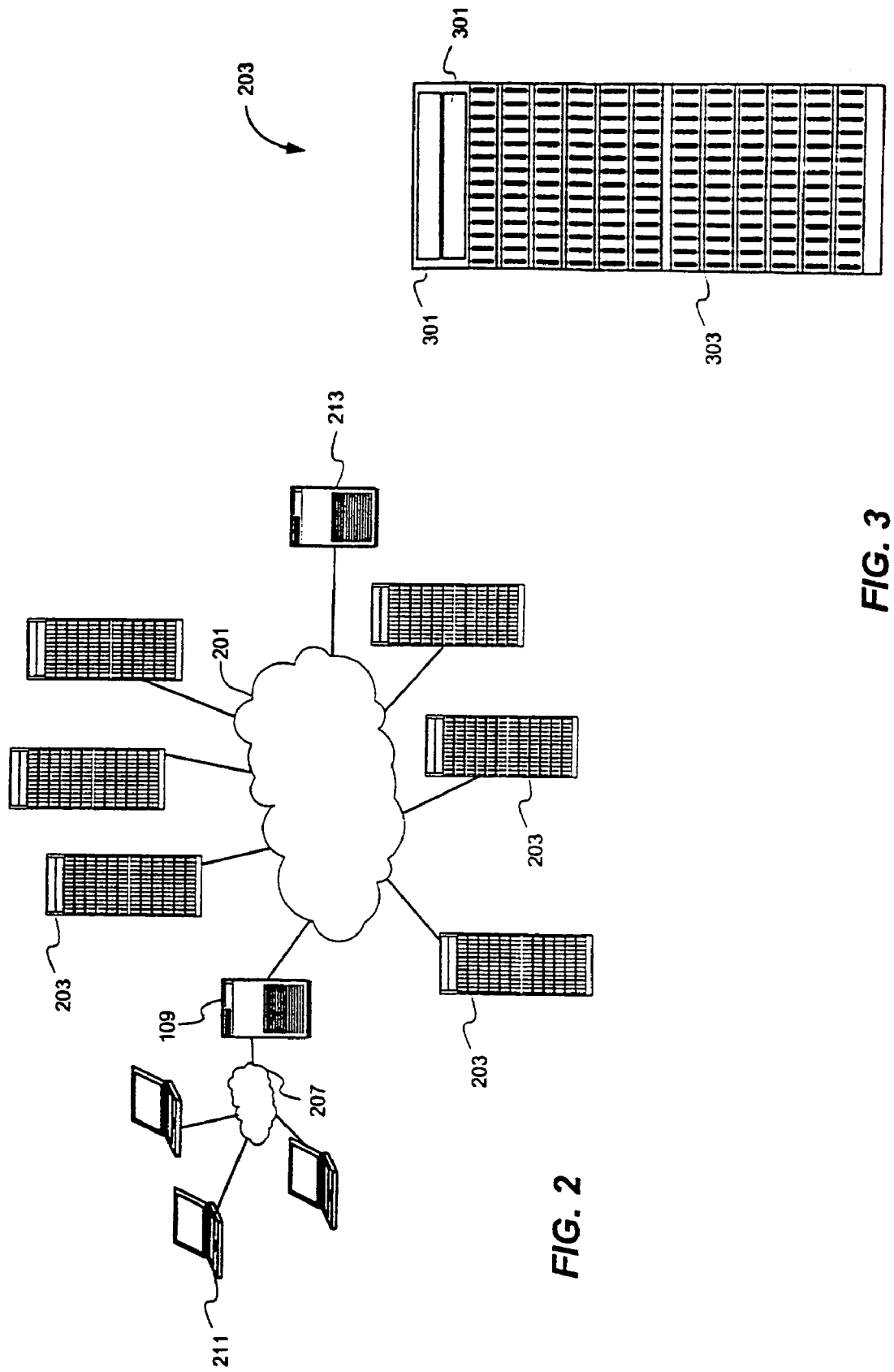
FIG. 2 illustrates a physical view of a networked computer environment in which the virtualized storage system in accordance with the present invention is implemented.
FIG. 3 illustrates a storage cell shown in FIG. 2 in greater detail.

FIG. 2 illustrates a physical implementation of virtualized storage in accordance with the present invention. Network 201, such as a fibre channel fabric, interconnects a plurality of storage cells 203. Storage cells 203 are accessible through fabric 201, or by management appliance 109 through LANs/WANs 207. Storage cells 203 essentially implement a storage pool 101. The number of storage cells that can be included in any SAN is primarily limited by the connectivity implemented by fabric 201. A fabric comprising even a single fibre channel switch can interconnect 256 or more ports, providing a possibility of hundreds of storage cells 203 in a single storage pool 101.

Host 213 includes adapter hardware and software to enable a connection to fabric 201. The connection to fabric 201 may be through an optical coupling or more conventional conductive cabling depending on the bandwidth requirements. A host adapter will often be implemented as a plug-in card on a host computer system. A host 213 may implement any number of host adapters to provide as many connections to fabric 213 as the hardware and software support.

As shown in FIG. 3, each storage cell 203 in the preferred embodiment comprises a pair of network storage controllers (NSCs) 301 coupled by a fibre channel arbitrated loop (FCAL) to a plurality of hard disks located in disk cabinet 303. NSC 301 implements a network interface to receive storage access requests from hosts as well as fibre channel arbitrated loop ports to connect to storage device in cabinet 303. NSCs 301 are coupled together over a high-speed connection such as a fibre channel point-to-point connection. While the particular embodiments are illustrated with fibre channel communication links, any communication protocol and hardware that provides sufficient bandwidth for a particular application may be used, including proprietary hardware and protocols.

Figure 4:
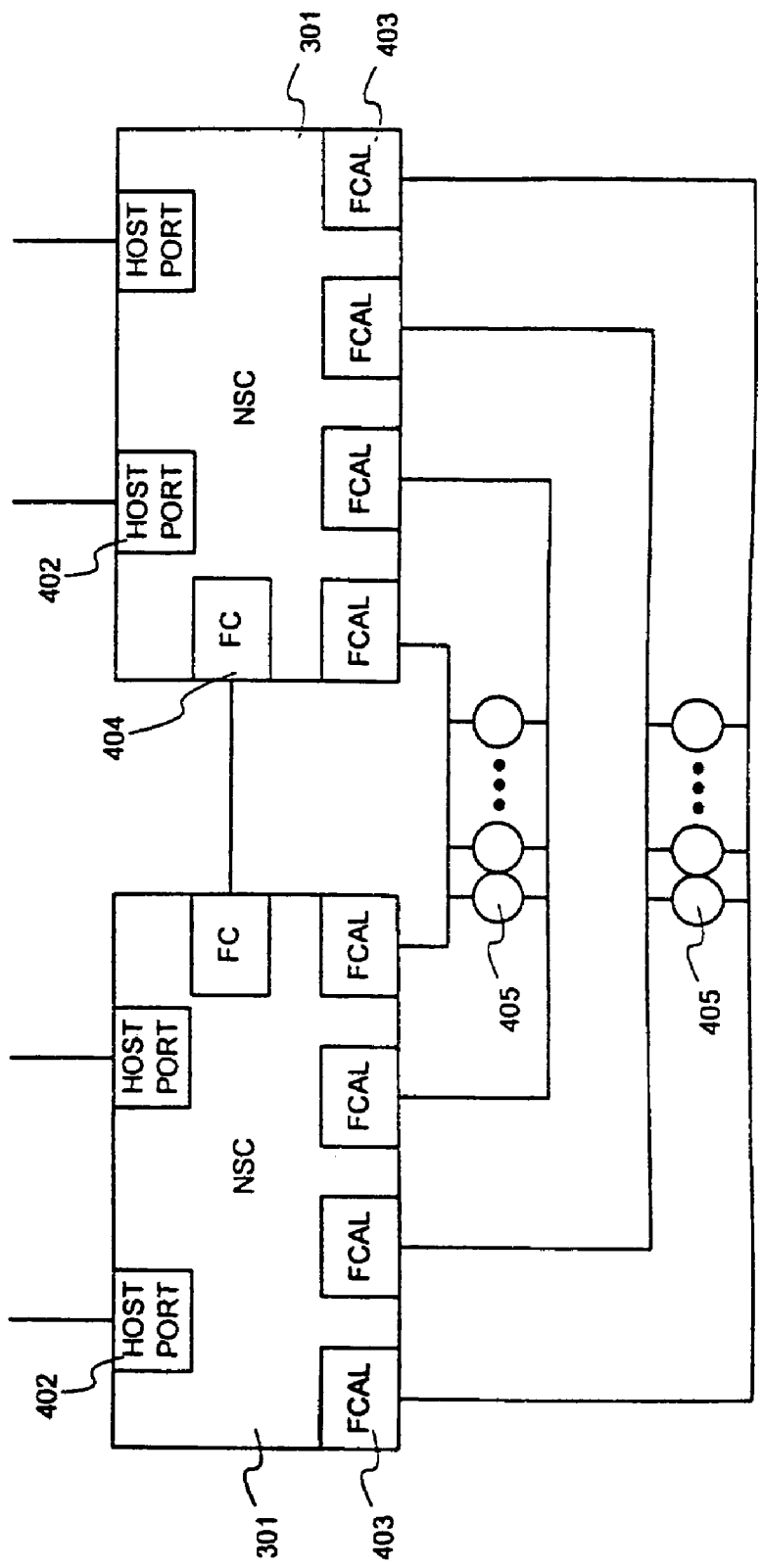
FIG. 4 shows a functional block-diagram of components of an alternative embodiment storage cell.

FIG. 4 illustrates a functional model of a storage cell 203 in greater detail. In the example of FIG. 4, storage cell 203 includes two NSCs 401 to provide redundancy. NSCs 301 are implemented microcomputers having a microprocessor and memory, as well as a plurality of fibre channel ports 402, 403 and 404. Host adapter ports 402 provide an interface to fabric 201 (shown in FIG. 2) and are implemented as FC N_Ports in a particular example. Each Host adapter port handles login to fabric 201, and is assigned a fabric-unique port ID in the login process. Dual host port connections on each NSC provide redundancy.

Any number of FCAL ports 403 may be implemented in each NSC 301, although four FCAL ports 403 per NSC 401 are used in the exemplary implementation. FCAL ports 403 are used to connect to drives 405 which comprise fiber channel drives. It should be understood that a variety of configurations are possible. For example, rather than an FCAL configuration, a fibre channel fabric using a switch could be used to couple to drives 405. The particular FCAL implementation shown allows up to 120 drives in each of two FCAL loops (240 drives per storage cell 203), where each loop is accessible by either NSC 301 to provide redundant connectivity. As each drive 405 may implement from 10 GB to 100 GB or more of storage capacity, a single storage cell 203 may implement vast quantities of storage. All of the storage that is accessible through a particular pair of NSCs 403 is considered to be within the storage pool 101 in which LDADs 103 can be implemented. While a SAN may include multiple storage cells 203, each cell 203 essentially implements and independent storage pool 101.

Each disk drive 405 is represented as a plurality of equal-sized physical segments. In a particular example, each physical segment (PSEG) comprises 4096 contiguous sectors, or 2 Mbyte of storage capacity. A 20 Gbyte drive will, therefore, provide 10K PSEGs, whereas an 80 Gbyte drive will provide 80K PSEGs. By decomposing physical drives into uniform-sized atomic units (PSEGs), the system can use PSEGs in a manner akin to how prior systems used drives. Essentially, PSEGs are treated as an atomic unit of storage rather than a physical drive. Because of this, the processes that manipulate data to, for example, implement parity, mirroring, striping, leveling, failure recovery and the like operate on much smaller units (PSEGs) rather than on entire drives as was done in the past. PSEGs are allocated to a particular storage task rather than drives. This atomicity increases the granularity with which the physical storage resources can be applied to a particular task, resulting in an increased flexibility in implementation of a particular LUN 102.

Specifically, drives 405 within a given storage cell 203 may vary in capacity as the present invention includes mechanisms that efficiently use all storage capacity. Moreover, drives 405 that are involved in the implementation of a particular LUN 102 may vary in capacity while at the same time efficiently using the disk capacity. This allows great flexibility in populating drives 405 so that the most cost and performance efficient drives can be selected at any given time, and storage capacity can grow or shrink incrementally without requiring replacement of drives 405.

Memory Allocation and SCSI Tunneling

In operation, each NSC 301 may act as a primary controller for a first pool of storage units, and the other NSC 301 will, by default, act as the mirror controller for the first pool of storage units. Thus, one NSC 301 may function as a primary controller for a first group of storage units and a mirror controller for a second group of storage units. The other NSC 301 may function as a mirror controller for the first group of storage units and a primary controller for the second group of storage units. The set of storage units for which any given NSC acts as a primary controller may increase or decrease to accommodate goals such as load balancing. The present invention concerns communication over the FC link between NSCs 301, and is particularly concerned with providing for efficient communication across the FC link so that the NSCs 301 can operate in a coordinated fashion.

Aspects of the present invention deal with allocating and managing memory in NSCs to increase the speed and efficiency of communication between the NSCs. The primary memory in one NSC 301 and the mirror memory in the other NSC 301 are allocated in corresponding blocks, so that allocating a block of primary memory in the first NSC 301 automatically allocates a corresponding block of memory in the second NSC 301. This relieves the CPU in the second NSC 301 from the task of allocating memory for mirroring operations.

In another aspect, the present invention provides for efficient command-response exchanges between tightly coupled processors that do not share memory using a serial link such as Fiber Channel. NSCs 301 employ a technique referred to as "SCSI tunneling" to increase the efficiency with which bandwidth on the FC link is used. NSCs 301 are configured to implement a "SCSI over FC" link communication path. This may be implemented using, e.g., a modified form of the SCSI assist feature of a TACHYON PCI-FC host adapter, commercially available from Agilent Technologies, Palo Alto, Calif., USA. More particularly, SCSI tunneling may be implemented by specifying the ReceiveID parameter in the SCSI assist feature of a TACHYON PCI-FC host adapter to identify the memory buffer(s) in the controller that is receiving the data. The packets are sequenced using a standard "sliding window" network protocol that provides for retransmission of lost or garbled packets such that order of requests can be strictly maintained.

A traditional SCSI command-response model requires preliminary communications between a sender and a receiver to negotiate and identify memory allocation for the transmitted data. The SCSI tunneling model of the present invention departs from a traditional SCSI command-response model by identifying named resources (e.g., memory buffers) for receiving packets at both the sender and the receiver when the communication link is established. Using named resources renders unnecessary the preliminary communications between a sender and a receiver to allocate memory for transmitted data. Instead, the sender simply transmits data to the named resource. As soon as an acknowledgment is received, the sender can immediately transmit more data to the named resource. Multiple named resources may be used in a round-robin fashion to increase the capacity available to the communication session between the sender and the receiver.

Efficient Active Mirroring of Data

Another aspect of the invention utilizes improved data flow models and processing techniques in the processors in the NSCs 301 to provide efficient active mirroring of data between NSCs 301. Write Back (WB) data is mirrored as part of the I/O process for a SCSI write command to a storage unit. In brief, the processors in NSCs 301 are configured to execute operations through a data flow queue (DFQ). I/O requests are typically processed in a DFQ using a software-based first-in, first-out (FIFO) algorithm. A Message Function Call (MFC) to a processor is transmitted with a data structure referred to as the Message Function Call Data (MFCD) that includes data fields providing context and resource information applicable to the MFC. The receiving process uses the context and resource information to invoke the mirror process. This process is explained in greater detail below.

Message Function Calls

NSCs 301 are configured as pairs and are connected to four Fiber Channel Arbitrated Loops (FCALs) to provide a communication path to the physical Fibre Channel drives that serve as raw storage capacity. The FCALs also provide a communication path between the NSCs 301. In addition NSCs 301 are connected by a direct "point-to-point" Fiber Channel connection. The NSCs 301 are configured to deliver messages on either the point-to-point connection or the FCALs (in the event of failure of the "point-to-point" connection) and to receive either an Acknowledge (ACK) that the message was delivered or an indication that the other controller in inoperative. The NSCs 301 are configured to ensure that messages AND Acknowledges (ACK) are delivered exactly in the order in which the messages were requested.

The first four bytes of a generic message (MFC) have a fixed format. One byte is reserved for an index (or function code) to indicate how the message is to be processed. A vector of call addresses is referenced via the index to find a message routine to call. Another byte contains flags that may be processed in a routine dependent manner. Two bytes are used to identify size of the entire message (including the first four bytes). The maximum message is approximately 2000 bytes. The Acknowledge received for a message indicates that the routine has been invoked on the controller to which it was sent. The ACK need not imply a status. Executing a message function call is analogous to calling a subroutine that returns no value and operates on a single data structure consisting of the message itself. This data structure exists only during the duration of the call.

A data structure is used to request that a message be sent. This data structure is referred to as a Message Function Call Data (MFCD). MFCD contains a standard Data Flow Header (DFH), which in turn contains a forward link, a backward link, an ID field, and a flow address. The ID field is available for use by the caller. The other fields are reserved for the function that sends messages. Additionally, the MFCD contains data fields for a Build Address, an ACK Address, a context, and for data. The context and data fields are reserved for the caller. The Build Address field defines the address of a routine (on the controller from which the message is to be issued) to build the message into an area provided. This routine is invoked with three parameters: 1) a pointer to the MFCD, 2) the address of an area into which to build the message, and 3) the number of bytes available in which to build a message. The ACK Address defines the address of a routine to call when an Acknowledge for the message has been received. It is called with two parameters: 1) a pointer to the MFCD, and 2) a status indicating either that the Acknowledge has been received or that the other controller has become inoperative.

The Build routine determines if the message it wants to build will fit into the area provided. If so, it builds the message and returns the number of bytes used. If not, it returns a value of 0 indicating the message is too big to fit. Multiple messages may be aggregated into a single message frame. Message frames are sequenced, processed, and acknowledged according to the standard sliding window network protocol. If a message will not fit in the sliding window, it (and all subsequent requests) waits for an available frame. Aggregation can be encouraged by limiting the number of message frames queued to the hardware. The number of message frames that are "in flight" may also be limited.

Building MFCs as message frames became available is valuable for a number of reasons. Frequently, the message data is lengthy and derived from other existing data. The message data may be generated directly into the message buffer, eliminating the need to set aside large amounts of storage for pending messages. Also, the overhead of moving the pending message data from somewhere to the frame may be eliminated.

Data Flow Process and MFCs

As noted above, the processors in NSCs 301 are configured to execute virtually all operations through a single data flow queue (DFQ). An item in the DFQ includes data that represents the context for a particular stage of the processing for a particular I/O request. When a hardware-assisted operation has completed processing, an item related to that operation flows through the DFQ. Processing of an item within the code that defines the Data Flow Process is minimal; most processing takes place in routines invoked (direct or indirectly) from the Data Flow Process.

The Fiber Channel hardware for the port over which MFCs are being sent is configured to signal an interrupt and generate data when a message frame is received. Using a software FIFO technique, a data structure related to the specific message frame buffer is pushed to the DFQ (a system wide named FIFO). The Data Flow (DF) process pops the next item off the DFQ and executes the routine addressed by the flow address in the Data Flow Header (DFH). The item address is passed as the parameter to this routine.

Routines invoked from the DF process are not permitted to invoke CPU scheduling primitives that block the current process. Instead, routines are required to consume the context indicated by the item to generate new work where something may be queued to the hardware or some process is scheduled and return. This method allows for minimal overhead when switching context to process different I/O threads. The context required at each stage is carried in one or more data structures referenced via the flow item; context is not distributed widely and multiply across a thread stack. This reduces data movement, memory requirements, and CPU scheduling overhead. There are mechanisms to block flow items that need a particular resource to proceed. These items are efficiently processed in the DF process when the resource becomes available invoking a resource flow routine in a manner similar to normal flow item processing.

Message frames are processed by a flow routine that takes an item as context that identifies the message frame address. Message frames are ordered by sequence number, and processing may be deferred if the frame does not contain the next expected sequence number. If the message frame is garbled, it is discarded and re-sent. Otherwise, the indicated function will be invoked for each message within the frame in the order in which they occur. The function is passed a pointer to the message itself. The function is constrained to execute under the same rules as any other flow process. However, the function may not use the message area to store data that persists after it returns. Thus, messages that require data structures for subsequent steps must reference a resource on the receiving controller that is allocated by the sending controller.

Allocation of referenced resources is achieved quite simply by the concept of implicit named "remote" resources. For example, each NSC 301 includes a set of resources referred to as "Redundant Invalid Entry" (RIE) items, which may be accessed as an array (e.g., by index). Each NSC 301 has a mirror set of Redundancy Invalid Entry (RIE) items that are reserved for use by the other controller. If the primary controller fails, then the mirror RIEs contain context consumed by the mirror controller to take over the processes of the failed controller (and vice-versa). In addition, each controller includes an array of "Mirror Nodes" (MNODE) that are associated with mirror RIEs. The MNODE is used to hold context for mirror operations related to the primary RIE. Primary RIEs are, in turn, related (e.g., by index to other data structures. Associating the RIEs with other data structures reduces a resource allocation overhead dramatically. Thus, messages that relate to RIEs can simply pass the index of the RIE. The invoked routine may then locate the MNODE to hold context for subsequent operations.

Extended Message Function Calls (XMFCs)

In an exemplary embodiment, a storage system in accordance with the present invention implements a data structure known as an Extended Message Function Call Data (XMFCD) to reduce complexity for non-performance path processing. The XMFCD contains an MFCD followed by another fixed-size structure. Then follows a variable sized area for the message to send. Then follows a variable sized area to put the response. The second fixed area contains the size of the message to send, the size of the response area, the offset to the response area, and the address of a routine to invoke when the response is received or the other controller fails.

The XMFC mechanisms use standard MFCs to send messages and receive the responses. The first part of the MFC has a fixed format and contains the address of the XMFCD in the sending controller's memory. The message also references a remote resource to be used in processing on the other controller. A "Response" MFC is used to deliver the response data. The "Build" and "ACK" routines are provided by the mechanisms. The ACK is handled by the mechanisms. When an ACK is received, the XMFCD is placed on a system-wide list. When the response is received, it is removed from the system-wide list and a callback routine is invoked. If one of the NSCs fails, then the other NSC processes the system-wide list to invoke the callback routines.

A synchronous mechanism is provided so that a process may build a message, send it, and wait for the response. An asynchronous mechanism is also provided such that a flow routine is invoked with the XMFCD as the item when the response is received for the other controller fails).

Mirroring Write Back (WB) Data

An exemplary storage system in accordance with the present invention uses MFCs in combination with Mirror Write Back data transfers to implement efficient mirroring of WB data. The NSCs are configured to receive an arbitrary amount of WB data on a particular Fiber Channel connection or a FCAL and to assign a FC "Exchange ID" (OXID), which may be used to automatically allocate she data into specified memory locations. Logic instructions on the receiving NSC build a data structure called as Scatter Gather List (SGL), allocate a resource called a Fiber Exchange Descriptor (FED), and invoke the mechanism to set up the hardware. A flow routine is invoked when the set up has occurred, passing the FED and the OXID as parameters. Similarly, given a FED, a SGL, and an OXID, a routine can be invoked to sent an arbitrary amount of WB data to the mirror NSC.

Figure 5:
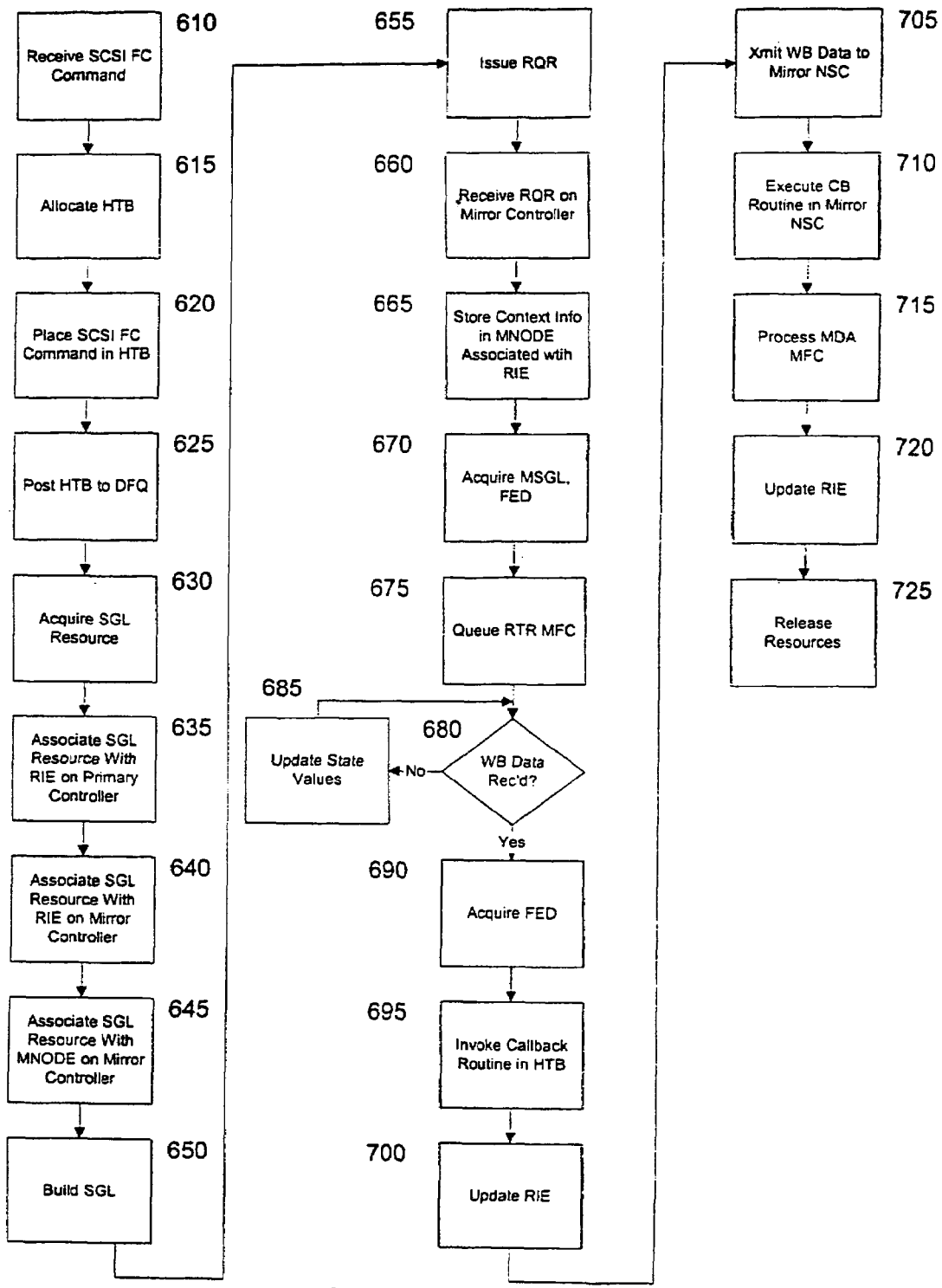
FIG. 5 is a flowchart illustrating a method of mirroring data in accordance with the present invention.

WB data may be mirrored as part of the I/O process for a SCSI write command to a virtual LUN on an NSC. FIG. 5 is a flowchart illustrating a method of executing an I/O process in accordance with the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring to FIG. 5, the I/O process starts when a SCSI FC command is received by the hardware (step 610). A Host Transfer Block (HTB) is allocated (step 615). The SCSI FC command data is placed in the HTB (step 620) and the HTB is posted to the DFQ (step 625). Assuming that command is valid, the LUN represents a normal virtual unit, sufficient WB buffers are available, and a Cache Lock can be granted (the range of blocks is not allocated for other commands), the I/O process acquires an SGL resource (step 630). The SGL resource is associated with a particular RIE on the primary controller (step 635), a particular RIE on the mirror controller (step 640), and a particular MNODE on the mirror controller (step 645). Buffers are acquired and the SGL is built.

WB data may already be in the cache of both NSCs for parts or all of the range of blocks for the given I/O request. This is referred to as "old" data. When the SGL is built, non-volatile metadata associated with each new buffer and each "old" buffer (if any) is manipulated along with the RIE (also non-volatile metadata) to implement a function referred to as "atomic write", which is addressed below. Then, using an MFCD embedded in the HTB, a ReQuest Read (RQR) MFC is queued to be sent (step 655). The RQR MFC contains data identifying the LUN, the starting VBA, the number of blocks, the RIE index, the number of old buffers, the addresses of the old buffers (if any), and the addresses of the new buffers. The RQR MFC associates the HTB with the RIE by storing the HTB address in a system array indexed by the RIE index. Next a routine is invoked to get the data for the write from the host that issued the I/O request and place it in the new buffers.

Referring to FIG. 5, when the RQR is received on the mirror NSC (step 660), context information is stored in the MNODE associated with the indicated RIE (step 665). This context information includes all of the data in the MFC. A Mirror SGL (MSGL) resource and a FED are acquired (step 670). The MSGL is built to define the mirror new buffers into which the mirror WB data is to be placed. The buffer-related non-volatile metadata and the mirror RIE may be manipulated to implement atomic write. The routine to set up the hardware to receive the data is invoked. When the callback is made indicating this has occurred, a RTR (Ready To Receive) MFC is queued (step 675) using a MFCD embedded in the MNODE. The MFC contains the OXID assigned, the RIE index, and an incarnation number that is used to indicate fail over of a mirror path.

When the RTR is received on the primary NSC (i.e., the one with the I/O process), the OXID and incarnation number are stored in the HTB. If the WB data has been received from the host, a FED is acquired and the mechanism to send the WE data is invoked. If not, a state value is updated. When the WB data from the host has been received, a callback routine specified in the HTB will be invoked. The RIE is manipulated to indicate that the new data is valid, the old data is invalid, but that the mirror data has not been sent. This causes the WB data to be valid "atomically" on the primary NSC.

When the mirror WB data is received, a callback routine specified in the FED will be invoked (step 710). The FED contains a pointer to the MNODE in its context field. If the status indicates the data was received successfully and a DTO MFC is not outstanding, a MDA (Mirror Data Absorbed) MFC is queued. The MDA MFC contains the RIE index. Also, the buffer related metadata and RIE are manipulated to implement atomic write.

When the MDA MFC is received, the RIE is updated (step 720) to indicate that the mirror data has been sent. The buffer-related metadata is processed to its final state and the RIE is updated to indicate it is no longer in use for an I/O request. The SGL resource will be released and FC SCSI status will be sent to host originating the I/O request. When this is done, the Cache Lock and the HTB resource will be released (step 725). This completes the I/O request.

The protocol for mirroring WB data must handle certain error cases. In one example, if one or more NSCs fail, then context information in the RIEs and the buffer-related metadata may be used for recovery. In another example, the host I/O may be aborted before the WB data is received from the host. In yet another example, the mirror WB data transmissions may fail if the FC frames are dropped. The system utilizes state information that records what data has been received (in both the primary and mirror NSC) to guide recovery from failure modes. A timer running on the mirror controller triggers the mirror controller to call back (the routine indicated in the FED callback parameter) with a special status indicating a "data timeout". A special status is used when the hardware indicates that the last data segment was received, but data segments in the message are missing. When the timeout status is received and the state indicates data is expected, a DTO (Data TimeOut) MFC that contains the RIE index is queued. The state is updated to indicate that a DTO has been sent.

When a DTO MFC as received, a DSS (Data Sent Status) MFC is queued. The state is updated to indicate this. The DSS MFC contains the RIE index and a status. The status can indicate "Sent", "Not Sent", or "Aborted". The request to get the WB data will always call back. The status indicates whether the data was received. If the data was not received, then the state in the HTB is updated to indicate that the request was aborted. Nothing else happens even if the RTR has been received (this fact is combined into the state). Eventually, a DTO will be received and a DSS is sent indicating "Aborted."

When a DSS MFC is received, processing depends on the current state and the status in the DSS MFC. If the data has actually been received correctly (i.e., if the status is "Sent" or "Not Sent"), the normal data reception handling is invoked and an MDA MFC queued. The FED callback with success and the state indicating DTO outstanding simply updates the state to reflect this. If the data has not been received yet and the status is "Not Sent", then the state is simply updated to indicate normal waiting for the data. If the data has not been received yet and the status is "Sent", a request is made to abort the operation associated with the FED. When this completes, FED callback will occur with a status of aborted leading to a request to set up the hardware again which will result another RTR MFC that eventually causes the mirror WB data to be sent again. The request to set up the hardware will also occur in the DSS MFC routine when the status is "Sent" and the data was received improperly (i.e., in error).

The state field in data structures on both NSCs keep track of ACKs being received or pending. At various points, subsequent steps may be delayed until ACKs are received. Also, special processing may occur when one or the other controller fails. Sufficient context is maintained to invoke appropriate routines to restart operations in the event of failure.

Atomic Write

For most NSCs, SCSI write commands that are interrupted by various failures can result in parts of the write data being "absorbed" and other parts being left unchanged (i.e., containing the previously written data). When the transfer size is one sector (512 bytes), either the new data will be absorbed or the old data will be retained. When this condition can be achieved for writes of more than one sector, the property of the controller is referred to as "atomic write". The "atomic write size" is the highest number of sectors (or blocks) that can be specified for a write command such that either all the data is absorbed or none of it.

In another aspect of the invention, a storage system implements atomic write for writes I/Cs of 256 blocks or fewer. Atomic write may be achieved by manipulating non-volatile metadata associated with each non-volatile WB buffer associated with the I/O request and by manipulating the Redundancy Invalid Entry (RIE) data structure.

For every non-volatile WB buffer and ever non-volatile mirror WB buffer, the system maintains a data structure referred to as a Buffer Metadata Array Entry (BMAE). The Buffer Metadata Array (BMA) is an array of data structures residing in non-volatile cache memory. Each BMAE corresponds to a particular non-volatile buffer in cache memory. Manipulating the address of the buffer derives the index into the BMA to reference the BMAE. It is also possible to go from the BMAE address to the buffer address. The BMAE defines the state of the data and where it belongs (i.e., the location on the SCVD it should be written).

The NOID Correlation Array (NCA) is an array of structures that reside in non-volatile cache memory. Each NOID Correlation Array Entry (NCAE) may describe the online condition of a particular SCVD. There should only be one NCAE describing a particular SCVD in the primary NV cache of one of the NSCs. When a unit is being mirrored, the corresponding entry on the mirror NSC will contain corresponding data about the SCVD. Since the NCA is an array, there is an index vale for every NCAE. This index value is referred to as an NCAE Index.

The BMAEs for all NV buffers that contain valid data for some SCVD and are not being referenced by an active I/O request have the same state value. This particular value (a combination of bits) is interpreted by software as "WB Valid." In addition, such a BMAE will contain the "NCAE Index", which references the SCVD, the VDA that indicates where on the SCVD it should be written, and a count of the number of 512-byte blocks within the buffer that are valid.

When buffers are being referenced during processing of an I/O request, the corresponding BMAEs are modified such that their states are interpreted using an overall state stored in a RIE. For the purposes of atomic write, the RIE has one of two sub-states: 1) Free or 2) Valid. The data supplied by the host for a write is understood to replace the current data for the specified range of blocks. This data is referred as the "New" data. There may be current data in the non-volatile cache that has not been written out. It is referred to as "Old" data.

The RIE is another structure that is a member of an array in non-volatile zone memory. It can be referenced via its "RIE Index." When being used for an I/O request, the RIE will contain the starting VDA and the number of blocks and the "NCAE Index" of the SCVD. When referencing an I/O request, a BMAE will contain an "RIE Index" instead of an "NCA Index." Note that the state, count, and index fields of a BMAE reside in the same word of computer memory. This allows them to be simultaneously updated with a single memory reference.

A BMAE that does not contain valid data and is not being used in the processing of an I/O request will have a state value indicating "Free". For the purposes of atomic write, a BMAE referencing an RIE (i.e., being used during processing of an I/O request) will be either in the "Provisional WB" or the "Provisional WB Not" state. When the BMAE state is "Provisional WB" and the RIE sub-state is "Free", the ultimate BMAE state is translated as "Free". When the BMAE state is "Provisional WB" and the RIE sub-state is "Valid", the ultimate BMAE state is translated as "WB Valid." When the BMAE state "Provisional WB Not" and the RIE sub-state is "Free", the ultimate BMAE state is translated as "WB Valid". When the BMAE state is "Provisional WB Not" and the RIE sub-state is "Valid", the ultimate BMAE state is "Free".

When an I/O request has been processed to the point that "New" data is about to be fetched, an RIE is allocated and initialized with the VDA, block count, "NCAE Index". It is set to the sub-state "Free." The BMAEs for the "Old" data (if any) are set to the state "Provisional WB Not." Should a crash occur during this process, the ultimate state of these BMAEs will be "WB Valid", which maintains the "Old" as the valid data. The BMAEs for the "New" data are set to the state "Provisional WB". Should a crash occur during this process or any time prior to a change in the RIE sub-state, the ultimate state of the "Old" will be "WB Valid" and of the "New" will be "Free." When the data for write I/O request has been received in its entirety (or the portion up to the atomic write size being processed), the RIE sub-state will be set to "Valid" with a single memory reference. As can be seen from the above state definitions, this results in the "New" data becoming "WB Valid" and the "Old" data becoming "Free" atomically in terms of their ultimate states. Note that crash processing resolves the ultimate states of all BMAEs as required.

When an I/O request (or atomic write sized portion) has finished, the BMAEs are processed to their ultimate states before the RIE is released. When units (SCVDs) are being mirrored, the "New" data must be mirrored (after being received, of course) to the mirror controller. The process on the mirror controller that handles the reception of this data manipulates mirror BMAEs and a mirror RIE in an essentially identical manner such that data is absorbed automatically on the mirror controller as well. There is a point where data is atomically absorbed on the primary side but not on the mirror side. Crash recovery and failover recovery handles these cases such that atomic write status is maintained. That is, under some circumstances the "New" data will end up absorbed. Under other circumstances, the "Old" data will remain and the partial "New" will be discarded. This is permitted because the ending status for the I/O request will not have been returned.

Maintaining Efficient Full-Duplex Connections

In another aspect, the present invention provides a mechanism to regulate the flow of pure data packets through a serial data path such that command-response data packets can be interspersed in a timely fashion. This procedure prevents a glut of pure data packets from blocking "command-response" data packets transmitted in the opposite direction on a full-duplex point-to-point link. In brief, to resolve this problem, the NSCs 310 reserve positions in the data flow to interject command-response data packets. The reserved positions may be fixed positions in time or relative time positions. Alternatively, the positions may be fixed or relative positions in the data stream.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of processing a write operation in a multi-controller processing environment wherein the write operation comprises a SCSI write command, comprising:

receiving, at a primary storage controller, a request for a write operation;

allocating a block of cache memory in the primary storage controller;

receiving, in the primary storage controller, data associated with the write operation;

reserving bandwidth on a communication link between the primary storage controller and a mirror controller for command response packets; and transmitting the command response packets on the reserved bandwidth; and transmitting the data from the primary storage controller to a corresponding block of cache memory in a mirror storage controller via the communication link, by:

allocating a host transfer block in the primary storage controller;

writing data associated with the write operation to the host transfer block; and posting the host transfer block to a data flow queue;

generating, in the primary storage controller, a scatter gather list data structure in resnonse to the write operation;

allocating a fiber exchange descriptor;

associating a scatter gather list with a redundant invalid entry managed by the primary storage controller;

associating the scatter gather list with a redundant invalid entry on the mirror storage controller; and associating the scatter gather list with a specific mirror node on the mirror storage controller.

2. The method of claim 1, wherein reserving bandwidth on a communication link between the primary storage controller and a mirror storage controller for command response packets comprises reserving positions on a serial communication link between the primary storage controller and the mirror storage controller.

3. The method of claim 1, wherein transmitting the data from the primary storage controller to a corresponding block of cache memory in a mirror storage controller via the communiction link comprises:
  issuing a request read message from the primary storage controller which contains data identifying a logical unit associated with the data, a starting virtual block address, a redundant invalid entry index, and at least one buffer address; and
  storing an address for the host transfer block in an array indexed by the redundant invalid entry index.

4. The method of claim 3, further comprising:
  receiving, at the mirror storage controller, the request read message from the primary storage controller;
  storing context information associated with the write operation in the mirror node associated with the redundant invalid entry index;
  constructing, in the mirror storage controller, a mirror scatter gather list; and
  transmitting a ready to receive message to the primary storage controller.

5. The method of claim 4, further comprising:
  receiving the data associated with the write command in the mirror storage controller;
  updating the redundant invalid entry index; and
  releasing the scatter gather list.

6. A computer program product comprising logic instructions stored on a computer-readable storage medium which, when executed by a processor, configure the processor to process a write operation in a multi-controller processing environment wherein the write operation comprises a SCSI write command by executing operations comprising:
  receiving, at a primary storage controller, a request for a write operation;
  allocating a block of cache memory in the primary storage controller;
  receiving, in the primary storage controller, data associated with the write operation;
  reserving bandwidth on a communication link between the primary storage controller and a mirror storage controller for command response packets;
  transmitting the command response packets on the reserved bandwidth; and
  transmitting the data from the primary storage controller to a corresponding block of cache memory in the mirror storage controller via the communication link, by:
    allocating a host transfer block in the primary storage controller;
    writing data associated with the write operation to the host transfer block; and
    posting the host transfer block to a data flow queue;
  generating, in the primary storage controller, a scatter gather list data structure in resnonse to the write operation;
  allocating a fiber exchange descriptor;
  associating a scatter gather list with a redundant invalid entry managed by the primary storage controller;
  associating the scatter gather list with a redundant invalid entry on the mirror storage controller; and
  associating the scatter gather list with a specific mirror node on the mirror storage controller.

7. The computer program product of claim 6, wherein reserving bandwidth on a communication link between the primary storage controller and a mirror controller for command response packets comprises reserving positions on a serial communication link between the primary storage controller and the mirror storage controller.

8. The computer program product of claim 6, wherein transmitting the data from the primary storage controller to a corresponding block of cache memory in a mirror storage controller via the communication link comprises:
  issuing a request read message from the primary storage controller which contains data identifying a logical unit associated with the data, a starting virtual block address, a redundant invalid entry index, and at least one buffer address; and
  storing an address for the host transfer block in an array indexed by the redundant invalid entry index.

9. The computer program product of claim 8, further comprising:
  receiving, at the mirror storage controller, the request read message from the primary storage controller;
  storing context information associated with the write operation in the mirror node associated with the redundant invalid entry index;
  constructing, in the mirror storage controller, a mirror scatter gather list; and
  transmitting a ready to receive message to the primary storage controller.

10. The computer program product of claim 9, further comprising:
  receiving the data associated with the write command in the mirror storage controller;
  updating the redundant invilid entry index; and
  releasing the scatter gather list.

11. A storage controller, comprising:
  a first port to receive a write operation from a host computer wherein the write operation comprises a SCSI write command;
  a second port to interface to one or more storage devices;
  a processor;
  a memory module connected to the processor and comprising logic instructions stored on a computer-readable storage medium which, when executed by the processor, configure the processor to:
    allocate a block of cache memory in the primary storage controller;
    receive, in the storage controller, data associated with the write operation;
    reserve bandwidth on a communication link between the primary storage controller and a second storage controller for command response packets;
    transmit the command response packets on the reserved bandwidth; and
    transmit the data from the storage controller to a corresponding block of cache memory in a the second storage controller via the communication link, by:
      allocating a host transfer block in the primary storage controller;
      writing data associated with the write operation to the host transfer block; and
      posting the host transfer block to a data flow queue;
    generate, in the primary storage controller, a scatter gather list data structure in resnonse to the write operation;
    allocate a fiber exchange descriptor;
    associate a scatter gather list with a redundant invalid entry managed by the primary storage controller;
    associate the scatter gather list with a redundant invalid entry on the second storage controller; and
    associate the scatter gather list with a specific mirror node on the second storage controller.

12. The storage controller of claim 11, wherein the memory module further comprises logic instructions which, when executed by the processor, cause the processor to reserve positions on a serial communication link between the storage controller and the second storage controller.

13. The storage controller of claim 11, wherein the memory module further comprises logic instructions which, when executed by the processor, cause the processor to:
- issue a request read message from the storage controller which contains data identifying a logical unit associated with the data, a starting virtual block address, a redundant invalid entry index, and at least one buffer address; and
- store an address for the host transfer block in an array indexed by the redundant invalid entry index.

14. The storage controller of claim 13, wherein the memory module further comprises logic instructions which, when executed by the processor, cause the processor to:
- receive, at the second storage controller, the request read message from the primary controller;
- store context information associated with the write operation in the mirror node associated with the redundant invalid entry index;
- construct, in the second storage controller, a mirror scatter gather list; and
- transmit a ready to receive message to the primary controller.

* * * * *

UNITED STATES PATENT AND TRADEMARK OFFICE
CERTIFICATE OF CORRECTION

PATENT NO. : 7,478,215 B2
APPLICATION NO. : 11/108360
DATED : January 13, 2009
INVENTOR(S) : Clark E. Lubbers et al.

It is certified that error appears in the above-identified patent and that said Letters Patent is hereby corrected as shown below:

On the face page, in field (57), under "Abstract", in column 2, line 8, delete "the primary controller and the" and insert -- a mirror controller. To --, therefor.

In column 2, line 11, delete "or" and insert -- of --, therefor.

In column 2, line 35, delete "controlled" and insert -- controller --, therefor.

In column 2, line 63, delete "or" and insert -- of --, therefor.

In column 4, line 34, delete "one" and insert -- the --, therefor.

In column 4, line 53, after "reduces" insert -- the --.

In column 5, line 57, delete "110" and insert -- 100 --, therefor.

In column 8, line 9, delete "with" and insert -- within --, therefor.

In column 13, line 51, delete "for" and insert -- (or --, therefor.

In column 13, line 59, delete "she" and insert -- the --, therefor.

In column 15, line 17, delete "WE" and insert -- WB --, therefor.

In column 15, line 60, delete "as" and insert -- is --, therefor.

In column 16, line 39, delete "I/Cs" and insert -- I/Os --, therefor.

In column 16, line 63, delete "vale" and insert -- value --, therefor.

In column 17, line 16, delete "zone" and insert -- cache --, therefor.

Signed and Sealed this

Thirteenth Day of July, 2010

David J. Kappos
*Director of the United States Patent and Trademark Office*

CERTIFICATE OF CORRECTION (continued)

In column 17, line 21, delete "NCA" and insert -- NCAE --, therefor.

In column 17, lines 65-66, delete "automatically" and insert -- atomically --, therefor.

In column 18, line 40, in Claim 1, after "mirror" insert -- storage --.

In column 18, line 41, in Claim 1, after "packets;" delete "and".

In column 18, line 45, in Claim 1, delete "in a" and insert -- in the --, therefor.

In column 18, line 53, in Claim 1, delete "resnonse" and insert -- response --, therefor.

In column 19, lines 3-4, in Claim 3, delete "communiction" and insert -- communication --, therefor.

In column 19, line 53, in Claim 6, delete "resnonse" and insert -- response --, therefor.

In column 20, line 27, in Claim 10, delete "invilid" and insert -- invalid --, therefor.

In column 20, line 49, in Claim 11, after "in" delete "a".

In column 20, line 57, in Claim 11, delete "resnonse" and insert -- response --, therefor.